United States Patent [19]
Tell

[11] Patent Number: 6,069,571
[45] Date of Patent: May 30, 2000

[54] APPARATUS AND METHOD FOR COLLECTING METER DATA

[75] Inventor: Daniel Francis Tell, Lake Forest, Ill.

[73] Assignee: Motorola, Inc., Schaumburg, Ill.

[21] Appl. No.: 08/756,193

[22] Filed: Nov. 25, 1996

Related U.S. Application Data

[63] Continuation of application No. 08/540,385, Oct. 6, 1995, abandoned.

[51] Int. Cl.[7] .................................................... H04Q 9/00
[52] U.S. Cl. ..................... 340/870.02; 379/107; 379/59; 455/67.1
[58] Field of Search ..................... 340/870.02, 870.03; 379/106, 107, 69, 59; 455/67.1

[56] References Cited

U.S. PATENT DOCUMENTS

| | | | |
|---|---|---|---|
| 4,350,980 | 9/1982 | Ward | 340/870.02 |
| 4,914,651 | 4/1990 | Lusignan | 370/69.1 |
| 5,438,329 | 8/1995 | Gastouniotis et al. | 340/870.02 |

*Primary Examiner*—Jeffery Hofsass
*Assistant Examiner*—Albert K. Wong
*Attorney, Agent, or Firm*—Heather L. Creps

[57] ABSTRACT

A meter data collection device (20) including an antenna (52), a meter interface (60) receiving data from a meter (64), and a radio frequency (RF) stage (50). The RF stage (50) is coupled to the antenna (52) and is responsive to the meter interface (60). The RF stage (50) is operable for transmitting the meter data over a control channel of a wireless communication system.

19 Claims, 8 Drawing Sheets

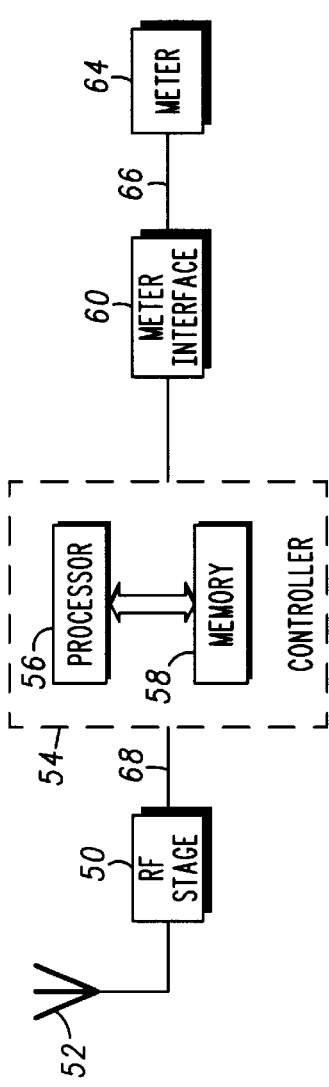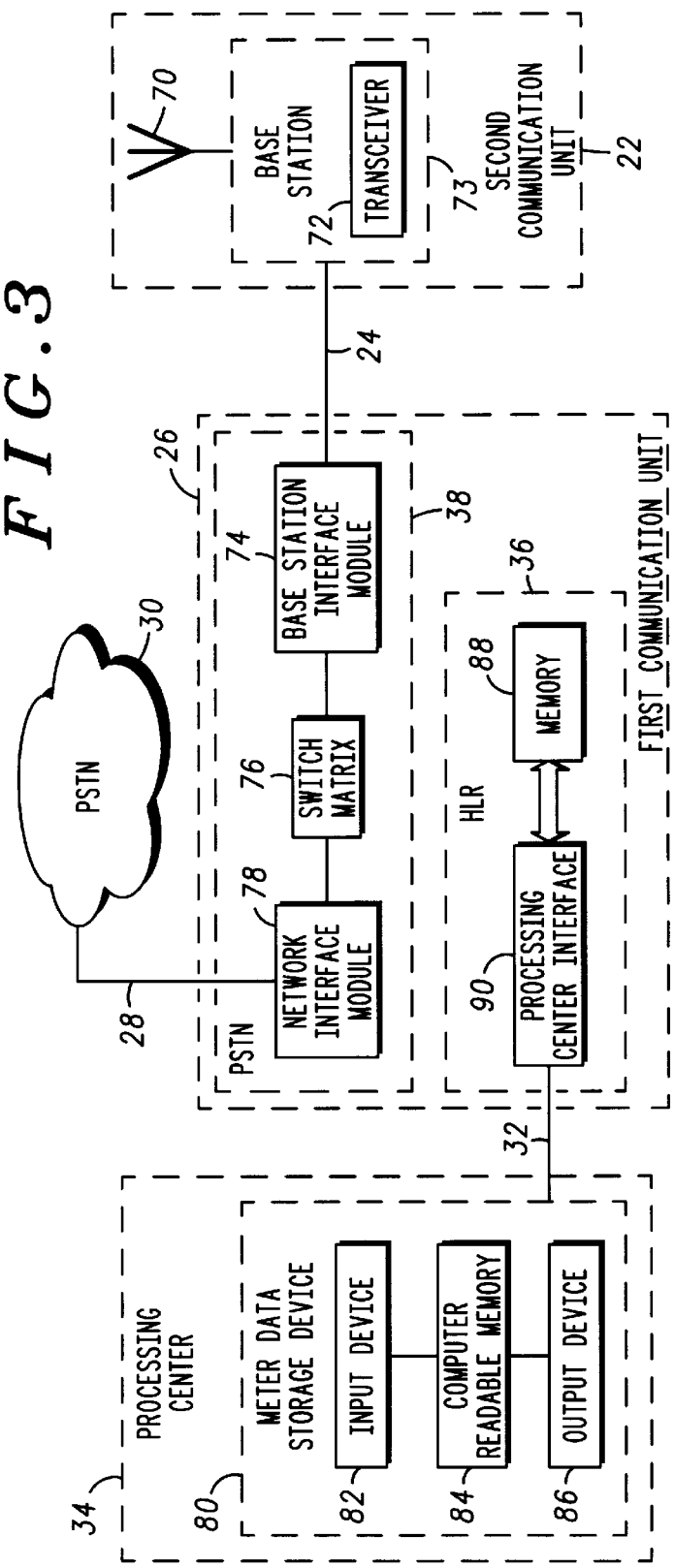

*FIG. 8*

REVERSE CONTROL CHANNEL
MESSAGE FORMAT
(POLL RESPONSE)

WORD 1: F1=11 (2) | 00 (2) | T=0 S=1 E=1 ER=1 (1,1,1,1) | 1 | SCM (4) | MIN 1 (24) | P (12)

WORD 2: F2=10 (2) | 00 (2) | MSL (5) | MST=1001 0000 (8) | LT=1 EP=1 (1,1) | 0000000 (7) | MIN 2 (10) | P (12)

WORD 3: F3=01 (2) | 11 (2) | SERIAL NUMBER (32) | P (12)

WORD 4: F3=00 (2) | 11 (2) | METER DATA (32) | P (12)

*FIG. 9*

FORWARD CONTROL CHANNEL
MESSAGE FORMAT
(OPERATION)

WORD 1: TITL=01 (2) | DCC (2) | MIN 1 (24) | P (12)

WORD 2: TITL=10 (2) | SCC=11 (2) | MIN 2 (10) | EF=1 (1) | MSL (5) | MST=1001 0010 (8) | P (12)

WORD 3: TITL=01 (2) | SCC=11 (2) | ACT (8) | DATA (16) | P (12)

FIG. 10
REVERSE CONTROL CHANNEL MESSAGE FORMAT

WORD 1: F1=11 (2) | 00 (2) | T=0 (1) | S=1 (1) | E=1 (1) | ER=1 (1) | SCM (4) | MIN 1 (24) | P (12)

WORD 2: F2=10 (2) | 00 (2) | MSL (5) | MST=1001 0000 (8) | LT (1) | EP=1 (1) | 0000000 (7) | MIN 2 (10) | P (12)

WORD 3: F3=01 (2) | 11 (2) | SERIAL NUMBER (32) | P (12)

FIG. 11
FORWARD CONTROL CHANNEL MESSAGE FORMAT (CONTROL)

WORD 1: TITL=01 (2) | DCC (2) | MIN 1 (24) | P (12)

WORD 2: TITL=10 (2) | SCC=11 (2) | MIN 2 (10) | EF=1 (1) | MSL (5) | MST=1001 0001 (8) | P (12)

WORD 3: TITL=10 (2) | SCC=11 (2) | ACT (8) | DEVICE ID (16) | P (12)

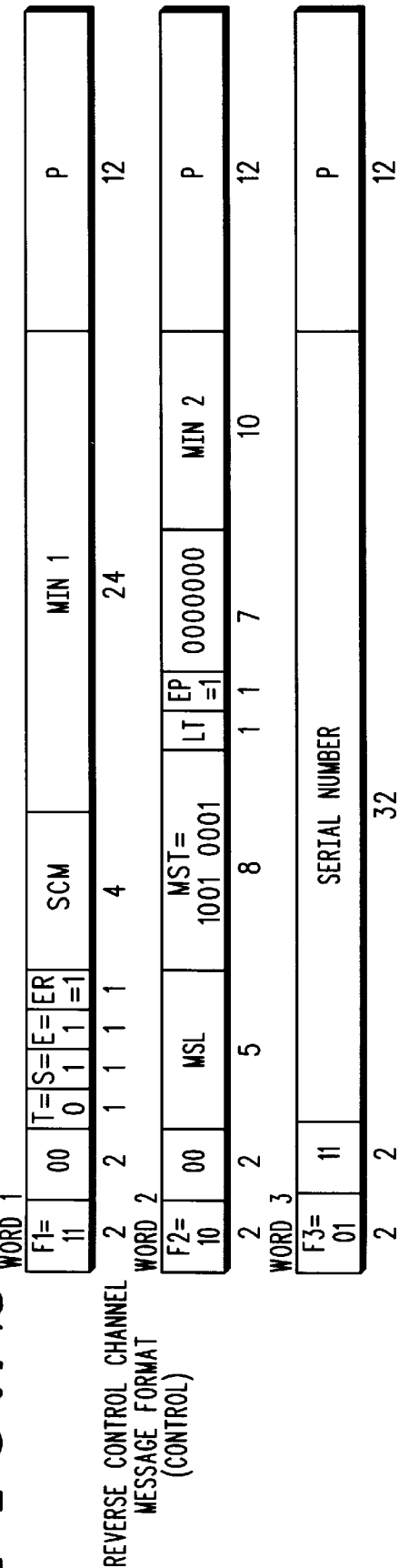

APPARATUS AND METHOD FOR COLLECTING METER DATA

This application is a continuation of application Ser. No. 08/540,385, filed Oct. 6, 1995, now abandoned.

FIELD OF THE INVENTION

This invention relates generally to meter data collection, and more particularly to collecting meter data using a wireless communication system

BACKGROUND OF THE INVENTION

Currently, utility meter reading is generally a manual operation. Typically, every month or two months, a meter reader from one of the utility companies (gas, water, power) walks door to door to visually read the utility meter connected to each house and record the measured data. Data collected is then entered into computers and fed back into central computers for billing and other processing. Due to the labor intensive nature of utility meter reading, it would be desirable to provide a more efficient automated method of performing meter reading.

A conventional automated method is to connect a meter to a phone line. Then, a person at the utility company can call the meter to receive the data. Using the public telephone system for performing meter reading has several disadvantages. For example, to transmit data, a circuit-switched connection using modems is typically used. Circuit-switched connections are relatively inefficient for transmitting burst data, such as data from a meter. Also, a meter has to be connected to a phone line. The phone line then has to be connected to a phone line termination within the house. Thus, a phone company representative typically provide the additional phone line connection to the meter. The added phone line connection adds to installation costs and is inconvenient.

Another conventional method of collecting meter data is performed by standard telemetry systems such as the system described in U.S. Pat. No. 5,438,329. However, for mass market telemetry to be effective, it should be ubiquitous and low cost. Conventional wireless telemetry systems, such as the system described U.S. Pat. No. 5,438,329, is a high cost alternative due to the considerable dedicated infrastructure used for data collection.

Accordingly, there is a need for a more efficient and convenient method and apparatus for providing automated meter reading.

SUMMARY OF THE INVENTION

The present invention addresses this need by providing a meter data collection device, a method of collecting meter data, a wireless communication system, a communication unit within a wireless cellular communication system, and a meter data storage device. The meter data collection device includes an antenna, a meter interface receiving data from a meter, and a radio frequency (RF) stage coupled to the antenna. The RF stage is responsive to the meter interface and is operable for transmitting the meter data over a control channel of a wireless cellular communication system.

The method of collecting meter data from a utility meter includes the steps of receiving meter data from the utility meter, storing the received meter data in a memory device, and transmitting the stored meter data over an air interface. The air interface includes a control channel of a wireless cellular communication system.

The communication unit in a wireless cellular communication system includes a base station interface module receiving meter data, a network interface module in communication with a telephone network, and a switch matrix coupling the base station interface module and the network interface module.

The wireless communication system includes a meter data collection device, a first communication unit in communication with the meter data collection device, and a second communication unit coupled to the first communication unit. The second communication unit comprises a first communication unit interface module receiving meter data from the first communication unit, a network interface module in communication with a telephone network, and a switch matrix coupling the first communication unit interface module and the network interface module.

According to a further aspect of the invention, a meter data storage device in communication with a communication unit in a wireless communication system and in communication with a processor is provided. The meter data storage device comprises an input device receiving meter data from the communication unit, a computer readable memory storing the meter data, and an output device transmitting at least some of the meter data to the processor.

The invention itself, together with its intended advantages will best be understood by reference to the following detailed description, taken in conjunction with the accompanying drawings.

BRIEF DESCRIPTION OF THE DRAWINGS

FIG. 2 is a block diagram of the meter data collection device of FIG. 1.

FIG. 3 is a more detailed block diagram of the wireless communication system of FIG. 1.

FIGS. 7–12 are diagrams illustrating data formats for messages that may be transmitted over the control channel used by the wireless communication system of FIG. 1.

DETAILED DESCRIPTION OF THE PREFERRED EMBODIMENTS

Figure 1:
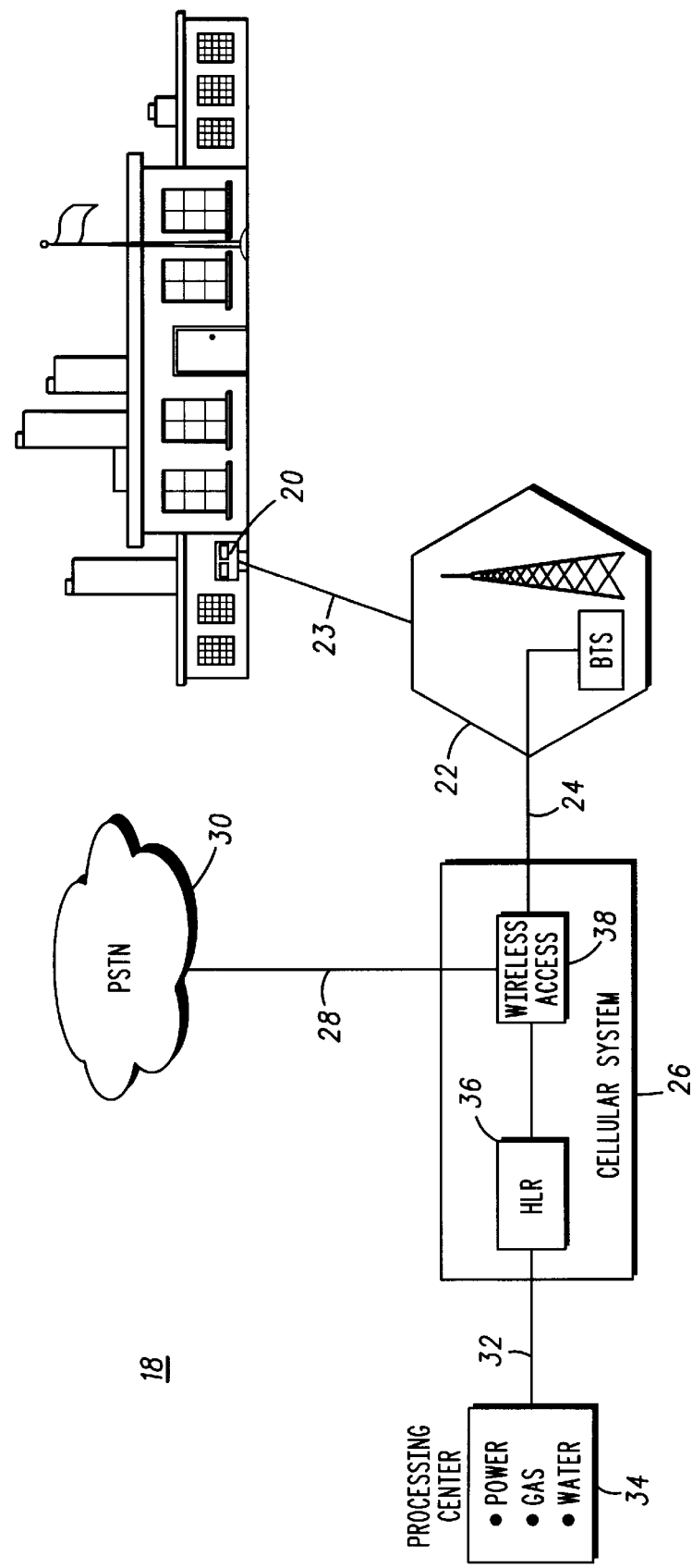
FIG. 1 is a diagram illustrating a preferred embodiment of a wireless communication system.
Figure 4:
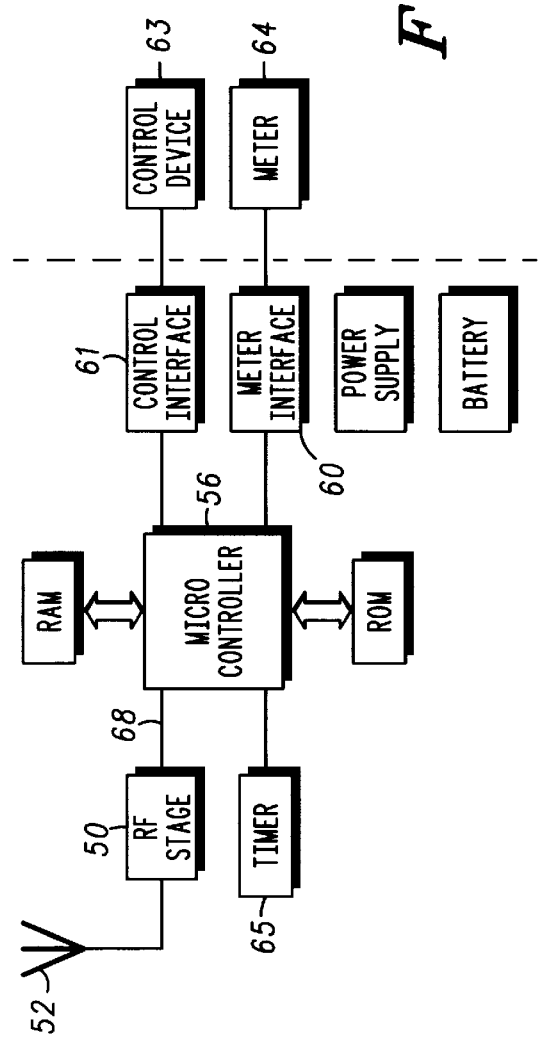
FIG. 4 is a block diagram of an alternative embodiment of the meter data collection device of FIG. 1.

Referring to FIG. 1, a preferred embodiment of a wireless communication system 18 is illustrated. The wireless communication system 18 includes a processing center 34, a first communication unit 22, a second communication unit 26, a public switch telephone network (PSTN) 30, and a metered data collection device 20. The first communication unit 22 is connected to the second communication unit 26 via a standard cellular infrastructure interface 24, such as a T1 line. The first communication unit 22 is coupled to the meter data collection device 20 via an air interface 23. More particularly, the air interface 23 includes a control channel of a wireless communication system. In the preferred embodiment, the air interface 23 is a Advanced Mobile Phone System (AMPS) or narrowband AMPS system as defined in Telecommunications Industry Association (TIA) Interim Standard (IS) IS-91 available from TIA at 2001 Pennsylvania Avenue N.W., Washington, D.C. 20006.

The second communication unit 26 is connected to the processing center 34 via a data communication link 32. The second communication unit 26 is connected to the PSTN 30 via a telephone network communication link 28. Preferably, the telecommunication link 28 is a T1 line. In the preferred embodiment, the first communication unit 22 includes a base station and an antenna. The second communication unit 26 is a communication unit within a cellular system that includes a wireless access unit 38 and an adjunct processor 36, preferably a home location register (HLR). The processing center 34 preferably processes utility meter collection data such as power, gas or water meter information. The processing center 34 is typically located at an appropriate utility company computer center.

During operation, the meter data collection device 20 at a predetermined instant of time or in response to a command from the second communication unit 26 collects meter data that has been read from a utility meter connected to the house or other residence. The meter data received from the utility meter is temporarily stored in a memory within the meter data collection device 20. The stored meter data is then transmitted over the air interface 23 to the first communication unit 22. The meter data received at the first communication unit 22 is then transmitted over the cellular interface 24 to the second communication unit 26. The second communication unit 26 then routes the data either to the PSTN 30 or to the processing center 34. At the processing center 34 the meter data is stored within a memory storage device, and then processed in order to place the meter data into a suitable format for billing.

Referring to FIG. 2, a preferred embodiment of the meter data collection device 20 is illustrated. The meter data collection device 20 includes an RF stage 50 connected to an antenna 52, a controller 54, and a meter interface 60. The meter interface 60 is connected to a standard utility meter 64 via a suitable electrical connection 66. The meter interface 60 may be a conventional interface such as described in U.S. Pat. No. 4,350,980. The controller 54 is connected to the meter interface 60 and is also connected to the RF stage 50 via a second electrical connection 68. The controller 54 includes a processor 56 and a memory 58 connected to the processor 56. The RF stage 50, the antenna 52, and the controller 54, are preferably circuit components taken from a standard cellular telephone, such as a Motorola Microtac II.

During operation, data from the meter 64 is transmitted to the meter interface 60, producing data in a digital format suitable for use by the controller 54. The controller 54 receives the digitally formatted meter data and stores this digital data into the memory 58. The controller 54 thereafter processes the data using processor 56 and transmits the meter data to the RF stage 50 over the second electrical connection 68. The RF stage 50 then performs standard RF processing such as modulation and then transmits the modulated meter data via antenna 52 over a control channel of the air interface 23. In a similar manner, a control signal received at antenna 52 is demodulated by RF stage 50 and sent to controller 54. The controller 54 then polls the meter interface 60 to collect data from the meter 64.

Referring to FIG. 3, a preferred embodiment of the first communication unit 22, the second communication unit 26 and the processing center 34 is illustrated. The first communication unit 22 preferably includes a base station 73, such as a Motorola Supercell SC9600™ base station, with a transceiver 72. The base station 73 is connected to an antenna 70. The second communication unit 26 includes the wireless access unit 38. The wireless access unit 38 preferably includes a base station interface module 74 which is connected to the base station 73, a switch matrix 76 connected to the base station interface 74, and a network interface module 78. The network interface module 78 is connected to the PSTN 30 via the telecommunication link 28, and is connected to the switch matrix 76.

The second communication unit 26 also includes an adjunct processor 36, which is preferably a HLR. The processor 36 includes a memory 88 and a processing center interface 90. The processing center interface 90 is connected to the processing center 34 via the computer communication link 32.

The processing center 34 includes a memory storage device 80. The memory storage device includes an input device 82, a computer readable memory 84, and an output device 86.

The second communication unit 26 receives meter data from the base station 73 which was received over the air interface 23 by the antenna 70. Base station interface module 74 receives the meter data and passes the meter data to the switch matrix 76. The switch matrix 76 routes the meter data to either the network interface module 78 for transmission to the PSTN 30 or to the adjunct processor 36. Meter data within the adjunct processor 36 is stored in memory 88 and then transmitted to the processing center 34 using the processing center interface 90 and the communication link 32. Within the processing center 34, the memory storage device 80 receives the meter data at the input device 82 and stores the meter data within the computer readable memory 84. The stored meter data within the memory 84 may then be transmitted from the processing center 34 using the output device 86. Typical applications which require reading the meter data from the computer readable memory 86 include utility billing processing routines.

In this manner, meter data collected from the meter 64 and transmitted over the air interface 23 to the base station 73 is further transmitted by the second communication unit 26 and sent to the processing center 34 within a utility company computer center. Such meter data may be collected in response to an operator command at the processing center 34. Alternatively, the processing center 34 may be programmed to automatically collect data from each meter collection device 20 in communication with the base station 73.

A particular preferred embodiment of a method of collecting meter data from the meter data collection device 20 will now be described with reference to FIGS. 5 and 6. Three classes of operation may be supported at the meter data collection device 20. These are polling, operational support, and remote control.

Polling is the process of collecting data associated with the meter and reporting it to the communication unit 22. Several modes of operation for polling are supported. A typical polling technique is a bulk poll, where data is accumulated over several days and is collected via a poll request from the communication unit 22. Counters within the controller 54 are subsequently reset. A second polling technique breaks a time period, such as a day, into a plurality of time intervals. Usage rates at each time interval are then collected and stored in the memory 58 until such time the device 20 is polled. In response to a poll, each of the time intervals are reported and then reset. The second polling technique may be useful if the utility company is billing on a time of day usage basis. A single poll sequence at an off peak hour would allow the system 26 to gather rate information for the entire day.

The second mode of operation involves operational support features. Such features include initialization, alarm setting, and diagnostic testing. A typical operational support feature is supported by the first communication unit 22 sending a command to the device 20 instructing the device 20 to set a desired polling technique. Another example of operational support is when the communication unit 22 sends a command to the device 20 to instruct the device 20 to reset counters or to perform a diagnositc test such as a power up self test.

The third mode of operation deals with remote control. Devices 63 connected to the processor 56 via a control interface 61 may be controlled remotely from the utility processing center 34. For example, if it were desired to power down certain regions of a building during periods of the day, it could be done via this mode of operation.

Figure 5:
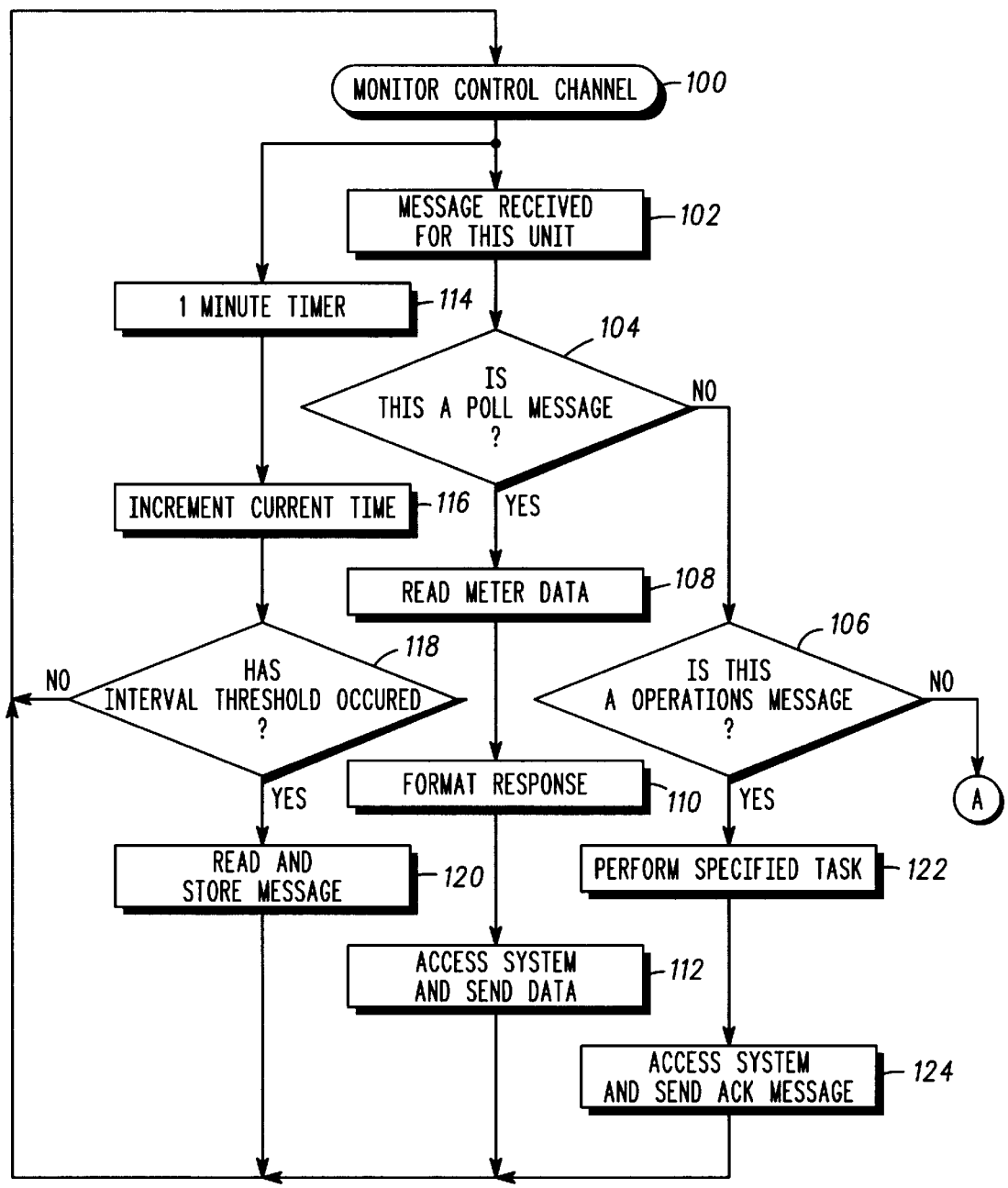
FIGS. 5 and 6 are flow charts detailing a preferred method of collecting meter data.
Figure 6:
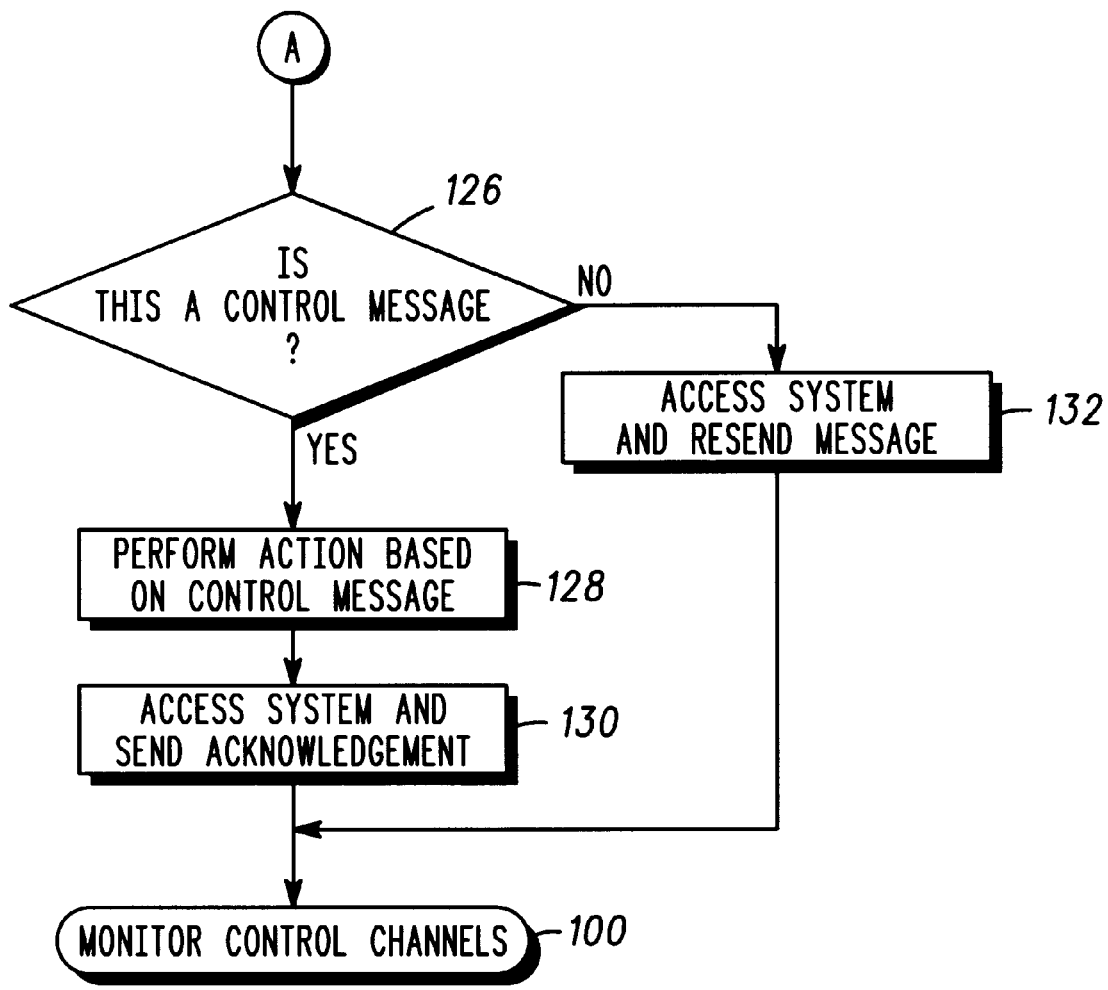

A flow chart of the meter data collection device process, and in particular that of the controller 54, is depicted in FIGS. 5 and 6. The typical state of operation will be that of monitoring the cellular signaling channels as specified in the air interface standard, which is denoted as step 100. In this step, the messages broadcast over the signaling channels are continually decoded in an effort to determine if the system desires to address this unit. Units may be globally as well as individually addressed.

Figure 7:
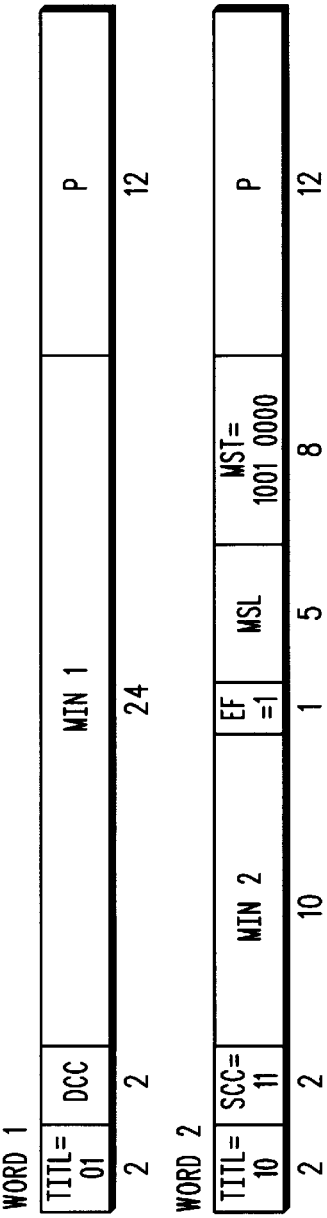

If a valid message is received for this unit, denoted as step 102, the controller 54 determines what action is requested. The first decision tree, step 104, is to check for a poll request message, such as is shown in FIG. 7. If this check is positive, the controller 54 reads data from the meter 34 via the meter interface 60, step 108. The data is then formatted for the response desired, step 110. An appropriate format is shown in FIG. 8. At this point the meter data collection device 20 accesses a control channel as specified in the air interface 23, and the data is sent to the communication unit 22, step 112. Thereafter, controller 54 returns to the monitor control channel mode at step 100.

If at step 104, the message is not a poll message, processing control flows to step 106, where a check is made to determine if the message is an operations message. An example of an operations message is shown in FIG. 9. If the test at step 104 is positive, the controller 54 ascertains what action is to be taken in response to the operational message at step 122. The controller 54 then sends an acknowledgment to the communication unit 22, step 124, and returns to monitoring the control channels, at step 100. The format of an operations response message is shown in FIG. 10. Typical actions performed by the device 22 include resetting counters associated with the meter data, initializing interval times maintained at the meter data collection device 20, and performing diagnostics.

If at step 106, the message is not an operational message, processing control flows to step 126, where a check is made to determine if the message is a control message, such as the control message shown in FIG. 11. If the test at step 126 is positive, the controller 54 selects a control element and performs an action using the selected control element, step 128. Subsequent to successful execution of the action, the system is accessed and an acknowledgment message is sent to the communication unit 22, step 130. The format of the acknowledgment message is shown in FIG. 12. Processing control then returns to monitoring the control channel at step 100.

If at step 126, the message is not a control message, processing control flows to step 132, where the message is rejected and the communication unit 22 is informed of the rejected message. Control then returns to step 100.

A second flow of execution that can occur from step 100 deals with the time control aspect of the system 18. Since time based operation of the system 18 is supported, the controller 54 may maintain time intervals and store data accordingly. Step 114 denotes expiration of a one minute timer 65 within the meter data collection device 20. When the timer 65 expires, current time of the system 18 is incremented and stored, step 116. That time is then compared to threshold intervals set through an operations message sequence, at decision step 118. If an interval has not been exceeded, control returns to step 100. If an interval is exceeded, the meter is read and the data from the meter is stored in controller memory 58 for that particular interval, at step 120. Control then returns to the monitor control channels, at step 100.

FIGS. 7 through 12 represent the downlink and uplink message formats, respectively, for the meter polling sequence. Note that other messages exist for different operations. The messages follow the extended protocol specification of the TIA IS-91 standard. Several new message type have been added, called telemetry poll message, and are defined as 1001 0000, operations messages, defined as 1001 0010, and control messages, defined as 1001 0001. All fields are defined in the air specification. Those skilled in the art will appreciate that additional message types may be defined as needed for other operations.

The preferred embodiments described above provide an automated meter data collection device. This preferred embodiment has many benefits. For example, cellular represents widespread infrastructure already deployed and cost amortized for a different purpose, that being voice based services. Leveraging of that infrastructure for telemetry services provides a low cost system to effect widespread coverage. Additionally no manual meter readers are required.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A utility meter data collection device having a plurality of operational modes, comprising:

an antenna;

a utility meter interface receiving utility usage data from a utility meter;

a radio frequency (RF) stage coupled to the antenna and responsive to the utility meter interface; and a controller in communication with the utility meter interface, the radio frequency stage and a control device, in a first mode, the controller instructing the RF stage to transmit the utility usage data over a control channel of a wireless cellular communication system and in a second mode the controller instructing the control device to perform a predetermined action.

2. The device of claim 1, wherein the controller includes a processor and a memory, the memory storing the utility usage data.

3. The device of claim 1, wherein the utility meter interface comprises an analog to digital converter.

4. The device of claim 1, wherein said utility meter is selected from the group consisting of an electricity meter, a water meter, and a gas meter.

5. A communication unit in a wireless cellular communication system, the communication unit comprising:
- a base station interface module receiving utility usage data from a utility usage-data collection device;
- a network interface module in communication with a telephone network;
- a switch matrix coupling the base station interface module and the network interface module; and
- a processor responsive to the switch matrix and in communication with a utility processing center,
- the utility processing center remotely instructing the utility usage-data collection device to transmit the utility usage data over a control channel of the wireless communication system, and the switch matrix routing the utility usage data to one of the network interface module and the processor.

6. The communication unit of claim 5, further comprising a memory storage device responsive to the processor and storing the utility usage data.

7. The communication unit of claim 6, wherein the utility usage data is transmitted from the memory storage device to the utility processing center.

8. A wireless communication system comprising:
- a first communication unit;
- a utility usage-data collection device having a plurality of modes of operation, the utility usage-data collection device responsive to the first communication unit and operable for transmitting utility usage data to the first communication unit over a control channel of the wireless communication system; and
- a second communication unit coupled to the first communication unit, the second communication unit comprising:
  - a first communication unit interface module receiving the utility usage data from the first communication unit;
  - a network interface module in communication with a telephone network; and
  - a switch matrix coupling the first communication unit interface module and the network interface module.

9. The system of claim 8, wherein said first communication unit comprises a base station.

10. The system of claim 8, wherein said wireless communication system comprises a radiotelephone system.

11. The system of claim 8, wherein said wireless communication system is selected from the group consisting essentially of a frequency division multiple access system, a time division multiple access system, and a code division multiple access system.

12. The device of claim 1, wherein in the first mode, the controller is responsive to a message from a utility processing center.

13. The device of claim 12, wherein the utility processing center comprises a billing center.

14. The device of claim 1, wherein the predetermined action comprises adjusting electricity usage in at least a portion of a building.

15. A method for controlling a utility usage-data collection device, the utility usage-data collection device coupled to a utility meter and responsive to a wireless communication system, the wireless communication system in communication with a utility processing center, the method comprising the steps of:
- receiving, by the utility usage-data collection device, a message over a control channel of the wireless communication system; and
- based on the message, entering one of a plurality of modes of operation.

16. The method of claim 15, wherein the message is selected from the group consisting essentially of: a telemetry poll message, an operations message and a control message.

17. The method of claim 16, wherein the one of the plurality of modes of operation is selected from the group consisting essentially of: a polling mode, an operational support mode and a remote control mode.

18. The method of claim 15, further comprising the step of:
- prior to receiving the message by the utility usage-data collection device, receiving, by the wireless communication system, a command from the utility processing center.

19. The method of claim 18, wherein the message is received by the utility usage-data collection device in response to the command.

* * * * *